March 16, 1926.

E. B. SHAND

ROTARY CONVERTER SYSTEM

Filed Feb. 18, 1925

1,576,856

WITNESSES:
Carl J. Loesch
O. B. Buchanan

INVENTOR
Errol Bertram Shand
BY
Wesley G. Carr
ATTORNEY

Patented Mar. 16, 1926.

1,576,856

UNITED STATES PATENT OFFICE.

ERROL B. SHAND, OF PITTSBURGH, PENNSYLVANIA, ASSIGNOR TO WESTINGHOUSE ELECTRIC & MANUFACTURING COMPANY, A CORPORATION OF PENNSYLVANIA.

ROTARY-CONVERTER SYSTEM.

Application filed February 18, 1925. Serial No. 9,995.

*To all whom it may concern:*

Be it known that I, ERROL B. SHAND, a subject of the King of Great Britain, and a resident of Pittsburgh, in the county of Allegheny and State of Pennsylvania, have invented a new and useful Improvement in Rotary-Converter Systems, of which the following is a specification.

My present invention relates to rotary converters and it has particular relation to such apparatus adapted for high-voltage railway service.

In electrification projects where it is desired to convert alternating currents of the order of 60 cycles to direct-current voltages of about 3000 volts, rotary converters have not been used, up to the present time, on account of limitations in such machines. The most serious limitation consists in the extreme difficulty of obtaining good commutation, by reason of the necessarily high voltage-differences between adjacent commutator bars, encountered on such high-voltage machines. The operation at 60 cycles is also a serious limitation, as it has been found that rotary-converter machines may be much more easily designed for 25 or 30 cycles than for 60 cycles.

The object of my present invention is to provide a practical 3000-volt unit, which shall meet the rigid requirements of railway service, and shall present economies in weight and cost, as compared to the equivalent motor-generator set which has heretofore been uniformly adopted for such service.

My invention comprises a cascaded set having an induction motor which is energized from the alternating-current line and is provided with a plurality of separately insulated polyphase secondary windings. Mounted upon the same shaft as the induction motor are a plurality of rotary converters which are separately energized from the secondary windings of the induction motor and which have their direct-current-output terminals connected in series.

The operation and advantages of the arrangement just described will be more fully pointed out with reference to the accompanying drawing, wherein—

Figure 1:
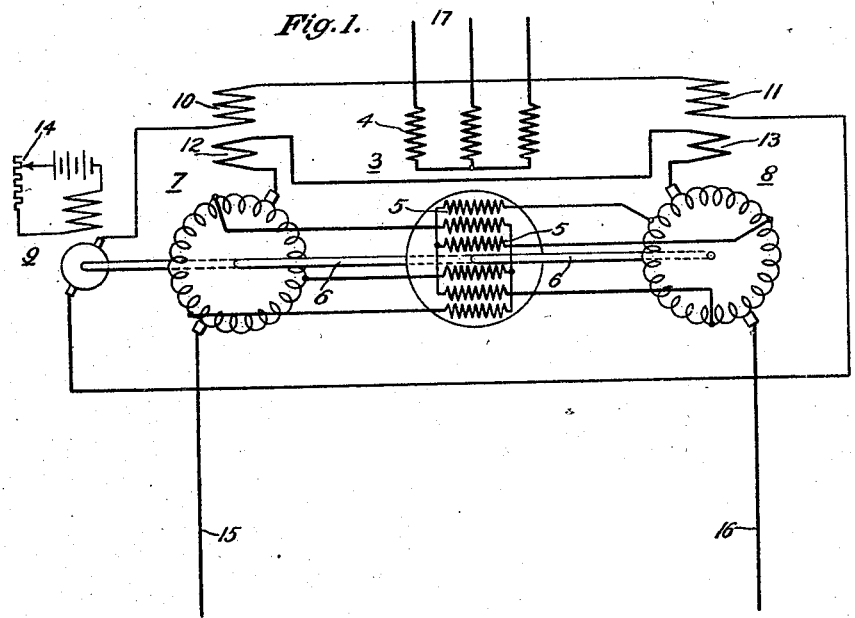
Figure 2:
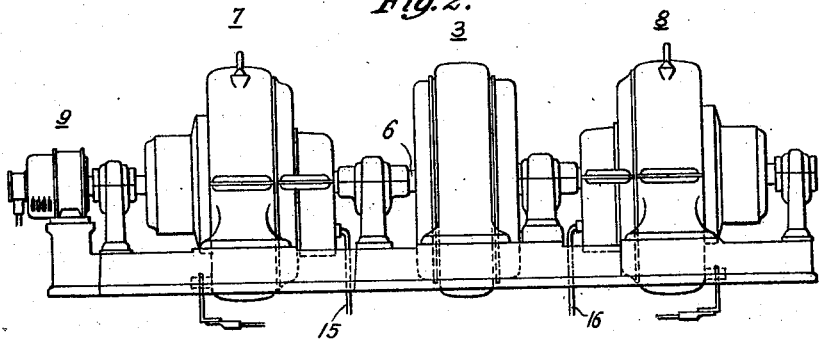

Figure 1 is a diagrammatic showing of circuits and apparatus embodying my invention in the form at present preferred by me, and Fig. 2 is an outline elevational view of the same.

My invention comprises an induction motor 3 having a stator member carrying a polyphase primary winding 4 and a rotor member carrying two separately insulated polyphase secondary windings 5. Mounted upon the shaft 6 of the induction motor 3 are two rotary converters 7 and 8 and an exciter 9. The rotary converters are not provided with slip rings, as they are energized directly from the respective secondary windings 5 of the induction motor.

The rotary converters 7 and 8 are excited by means of shunt field windings 10 and 11, respectively, and series field windings 12 and 13, respectively. The shunt field windings 10 and 11 are connected in series across the armature of the exciter 9, the excitation being controlled by means of a rheostat 14 in the field circuit of the exciter. The series windings 12 and 13 are connected in series with the direct-current brush-terminals of the rotary converters, and the two direct-current output circuits of the two rotary converters are connected in series to energize a direct-current line 15, 16, the voltage of which is equal to the sum of voltages of either converter.

By the construction just described, it is possible to convert from a rather high alternating-current voltage to a direct-current voltage of the order of 3000 volts, without resorting to transformers, and without encountering any difficulties whatsoever in the commutation of the rotary converters. It is entirely feasible to insulate the primary winding of an induction motor for voltages as high as 11,000 volts or more, and hence the unit comprising my invention may be directly connected across the alternating-current feeder line 17.

In the set illustrated in the drawing, the number of poles is the same in all three machines, namely six poles, so that, with a 60-cycle supply, the set operates at 600 R. P. M. The result of this arrangement is that the rotary converters have impressed thereon a frequency of 30 cycles, which is much more desirable than utilizing 60-cycle converters. Moreover, each converter is wound for only one half of the direct-current line voltage, thereby avoiding the necessity for a 3000-volt commutator.

One half of the power is electrically transmitted by means of currents furnished by the induction-motor secondary windings to the rotary converters, and one half of the power is mechanically transmitted by means of torque in the shaft 6, causing the rotary-converter machines to operate as direct-current generators. It is, of course, possible that other ratios of pole numbers might be adopted. Thus, if the rotary converters had four poles while the induction motor had six, the rotary converters would operate at a frequency of 24 cycles, and 40% of the power would be transmitted electrically and 60% mechanically.

By reason of the fact that one half of the power is transmitted electrically, in the preferred embodiment, my invention results in about a 30% saving in weight and 20% saving in cost, as compared with a motor-generator set such as has heretofore been uniformly used for supplying 3000-volt direct-current railway lines.

It is desirable that the entire set shall, at all loads, draw currents of substantially unity power factor from the alternating-current line 17, and, to this end, the rotary converters are provided with the compounding windings 12 and 13. It is also desirable that the wattless power shall be equally divided between the two rotary converters, as, otherwise, one of the machines might be damaged by the excessive current-flow therein. I have, therefore, connected the shunt windings 10 and 11 in series with each other, in order that they may be energized by the same current. It is obvious, however, that any other means for securing similarity of excitation in the two rotary converters may be utilized.

It will be noted that the ratio between the pole number of the rotary converters and the pole number of the alternating-current motor, and the ratio between the numbers of turns in the primary and secondary windings of the alternating-current motor, should be so chosen that the voltage generated in each secondary winding corresponds to one-half of the direct-current line voltage. Thus, the secondary windings of the induction motor are, in general, wound for a much lower voltage than the primary windings.

Whereas I have shown my invention in a preferred form, utilizing two rotary converters, it is obvious that any number of rotary converters may be utilized, in connection with an equal number of separate secondary windings on the rotor member of the induction motor. It will be obvious that these and other modifications may be adopted without departing from the spirit of my invention as defined in the subjoined claims.

I claim as my invention:

1. The combination with an alternating-current motor having a stator member and a rotor member, said stator member carrying a polyphase primary winding and said rotor member carrying a plurality of polyphase secondary windings insulated from each other, of a plurality of rotary converters mechanically connected to said rotor member, connections for energizing one rotary converter from each of said polyphase secondary windings, and connections for connecting the direct-current terminals of said rotary converters in series.

2. The combination with an alternating-current motor having a stator member and a rotor member, said stator member carrying a polyphase primary winding and said rotor member carrying a plurality of polyphase secondary windings insulated from each other, of a plurality of rotary converters mechanically connected to said rotor member, connections for energizing one rotary converter from each of said polyphase secondary windings, and connections for connecting the direct-current terminals of said rotary converters in series, the ratio between the pole number of said rotary converters and the pole number of said alternating-current motor, and the ratio between the numbers of turns in the primary and secondary windings of said alternating-current motor, being so chosen that the voltage generated in said secondary windings is less than the voltage impressed on said primary windings.

3. The combination with an alternating-current motor having a stator member and a rotor member, said stator member carrying a polyphase primary winding and said rotor member carrying a plurality of similar polyphase secondary windings insulated from each other, of a plurality of rotary converters mechanically connected to said rotor member, connections for energizing one rotary converter from each of said polyphase secondary windings, connections for connecting the direct-current terminals of said rotary converters in series, and means for maintaining the same excitation on each of said rotary converters.

In testimony whereof, I have hereunto subscribed my name this 11th day of February, 1925.

ERROL B. SHAND.